June 2, 1964 D. R. BIEGEL 3,135,461

DATA RECORDING MACHINE

Filed July 18, 1961 8 Sheets-Sheet 1

INVENTOR.
DONALD R. BIEGEL
BY
Miketta and Glenny
ATTORNEYS.

June 2, 1964 D. R. BIEGEL 3,135,461

DATA RECORDING MACHINE

Filed July 18, 1961 8 Sheets-Sheet 2

INVENTOR.

DONALD R. BIEGEL

BY

Miketta and Glenny

ATTORNEYS.

June 2, 1964 D. R. BIEGEL 3,135,461

DATA RECORDING MACHINE

Filed July 18, 1961 8 Sheets-Sheet 3

INVENTOR.
DONALD R. BIEGEL
BY Miketta and Glenny
ATTORNEYS.

DATA RECORDING MACHINE

Filed July 18, 1961

INVENTOR.
DONALD R. BIEGEL
BY
Miketta and Glenny
ATTORNEYS.

DATA RECORDING MACHINE

Filed July 18, 1961 8 Sheets-Sheet 5

INVENTOR.
DONALD R. BIEGEL
BY
Miketta and Glenny
ATTORNEYS.

DATA RECORDING MACHINE

Filed July 18, 1961 8 Sheets-Sheet 6

INVENTOR.
DONALD R. BIEGEL
BY Miketta and Glenny
ATTORNEYS

INVENTOR.
DONALD R. BIEGEL
BY Miketta and Glenny
ATTORNEYS.

INVENTOR.
DONALD R. BIEGEL
BY Miketta and Glenny
ATTORNEYS.

3,135,461

DATA RECORDING MACHINE

Donald R. Biegel, North Hollywood, Calif., assignor to Datanamics, Inc., Van Nuys, Calif., a corporation of California Filed July 18, 1961, Ser. No. 124,826
26 Claims. (Cl. 234—45)

This invention relates to a data-recording machine for transferring information from a data-bearing card such as a credit card or the like to a data record or storage form, such as an invoice form, sales slip, or the like, and particularly to such a data machine adapted for use at the place where a sale or transaction is made. This application is a continuation in part of co-pending application Serial No. 80,416, filed January 3, 1961, entitled "Source Punching Device."

The wide and extensive use of credit cards in merchandising of numerous products, particularly gasoline and consumer goods, and the increased use of data processing equipment and machines for record, accounting and billing purposes, have created a condition wherein it is highly desirable to provide a record of a sales transaction at the point of sale and in machine code form. Credit cards may include embossed data such as the name and account number and may also include such data in the form of machine code such as selectively arranged perforations in the card. Invoice or sales slip forms may include a stiff card portion such as in IBM tab cards which may be punched in accordance with data carried by the credit card, variable data indicating the amount of the sales transaction, and repetitive or fixed data indicating the station at which the transaction took place. Such punched invoice form may be directly processed.

In the prior proposed machine described in said application Serial No. 84,416, a credit card and data record form were advanced, vertically separated and positioned at opposite ends of a plurality of punch members, sensing pins were adapted to pass through holes in the card to select punch members, the punch members were locked, and then the selected punch members were moved into punching engagement with the invoice form. The punch members were normally restrained against unwanted movement by friction material which grasped sides of the punch members.

The present invention contemplates a data recording machine in which the punch members may be frictionally grasped as described in the aforesaid application. However, the present invention contemplates an improved design and mode of operation which affords a particularly compact relatively small efficient machine. The present machine embodies a construction in which the invoice form is moved into oriented operative position with respect to a group of punch members at a punch zone and the credit card is moved into a card reading zone which is horizontally or laterally off-set from the punch zone. The present machine includes a selector bar movable across the credit card for sensing a hole therein, the bar being provided with a punch element which is simultaneously positioned relative to one punch member in a row of ten punch members for transferring data from the credit card to the group of punch members and the invoice form therebeneath. Certain selector bars are readily locked in desired position for translating to the invoice form repetitive data. Another group of selector bars may be manually actuated for selecting variable data and translating such variable data, such as the amount of sale, to the invoice form through the punch members. Generally speaking, the arrangement of the card reading zone and the punch zone has permitted the construction of a data recording machine having a minimum number of parts, a more simple positive construction, and a fool-proof construction and operation, all of which permits the machine to be manufactured with less expense and with greater efficiency.

The primary object of the present invention is to disclose and provide an improved efficient data recording machine embodying a novel construction and mode of operation.

An object of the invention is to disclose and provide a data-recording machine employing a novel arrangement for sensing of data on a data-bearing card.

Another object of the invention is to disclose and provide a data-recording machine wherein a card reading zone and a punch zone are disposed in laterally off-set relation.

A further object of the invention is to disclose and provide a data-recording machine wherein a plurality of punch members are provided and wherein a plurality of punch selector bars are disposed in operative relation to the punch members, certain of said punch selector bars being locked in fixed relation to certain rows of said punch members, certain others of said punch selector bars being biased and controllably movable across the credit card for sensing data thereon, and other of said selector bars being manually movable for selection of an amount representing a sales transaction.

A still further object of the invention is to provide a data-recording machine wherein operation of the machine is prevented by interlock means which require that certain conditions be met before the actuating arm of the machine can be operated for a punching operation.

A still further object of the invention is to provide means on such a data-recording machine wherein once a punching operation has been commenced by movement of the actuating arm, the punching operation must be completed.

A still further object of the invention is to disclose and provide a data-recording machine which may be readily adapted for use with embossed or debossed cards in order to perform a printing operation from the card to the invoice form as part of the data transferring operation.

Various objects and advantages of the present invention will be readily apparent from the following description of the drawings in which an exemplary embodiment of the invention is shown.

*General Mode of Operation*

Before describing the data recording machine generally indicated at 30 in detail and to facilitate better understanding of the detailed description thereof, the general mode of operation and the results achieved thereby are briefly related. A data-bearing card 31 of suitable plastic composition or metal material may be provided with a plurality of data holes or perforations 32 arranged in a selected code pattern to provide in code the name, address, account number, and other information pertaining to the account or holder of the card. The credit card 31 may also include the name, address and account number in stamped, printed and embossed or debossed form on an adjacent portion of the card as at 33. The card 31 may also be used for data pertaining to other accounting, bookkeeping, production and industrial operations, depending upon the use for which the machine is intended.

Figure 15:
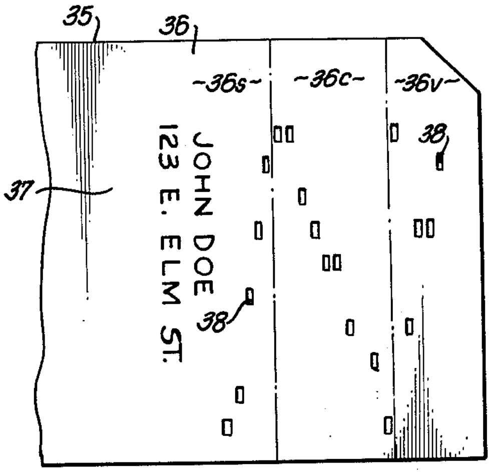
FIG. 15 is a fragmentary plan view of a data record form or sales slip to which data is transferred.

A data record form 35 (FIG. 15) may include a generally elongated rectangular form provided with a relatively stiff portion 36 to which the coded information on the card may be transferred as by punching in well known code language or intelligence at section 36*c*. Adjacent section 36*c* information concerning the station at which the card is punched may be transferred at 36*s* and the name of the card owner and his address may be printed as at 37. At the end of form 36 a section 36*v* may be provided which may be punched according to selected variable data such as the amount of a sale transaction. It will be noted that the data record from 36 may be a sales slip, an invoice form or record form and that the rectangular punched openings 38 provided therein are of a size and arrangement which will conform to well known data processing machines such as IBM machines. The data record form 35 may include a multi-page form wherein the station attendant may also write for the purchaser's personal record as well as the station record the amount of sale and the items purchased. The stiff portion 35 will thus permit immediate processing of the transaction in data machines using and translating selected codes such as Hollerith, numeric, binary or other desired data processing code.

Figure 3:
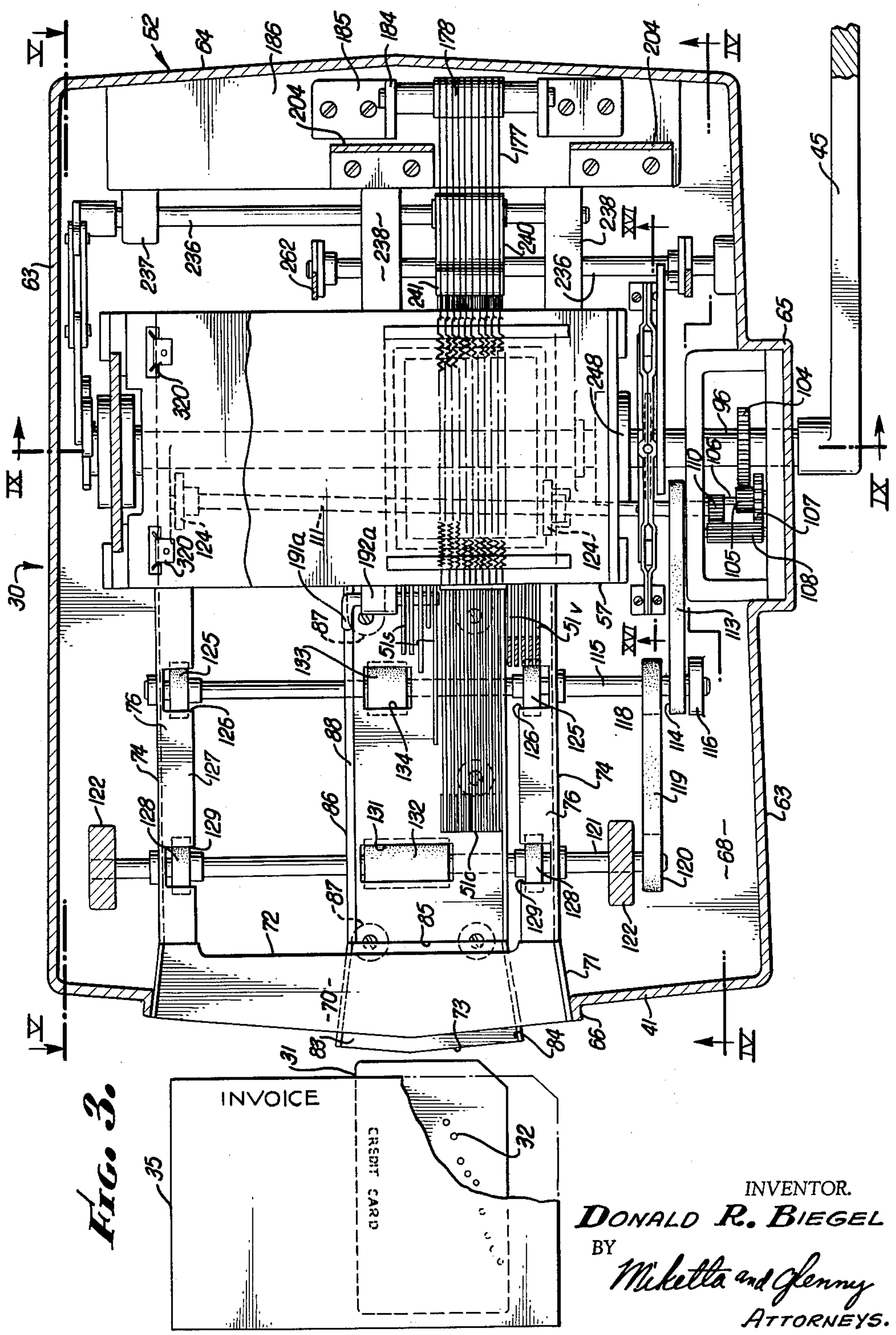
FIG. 3 is a sectional view taken in the horizontal plane indicated by line III—III of FIG. 4.
Figure 4:
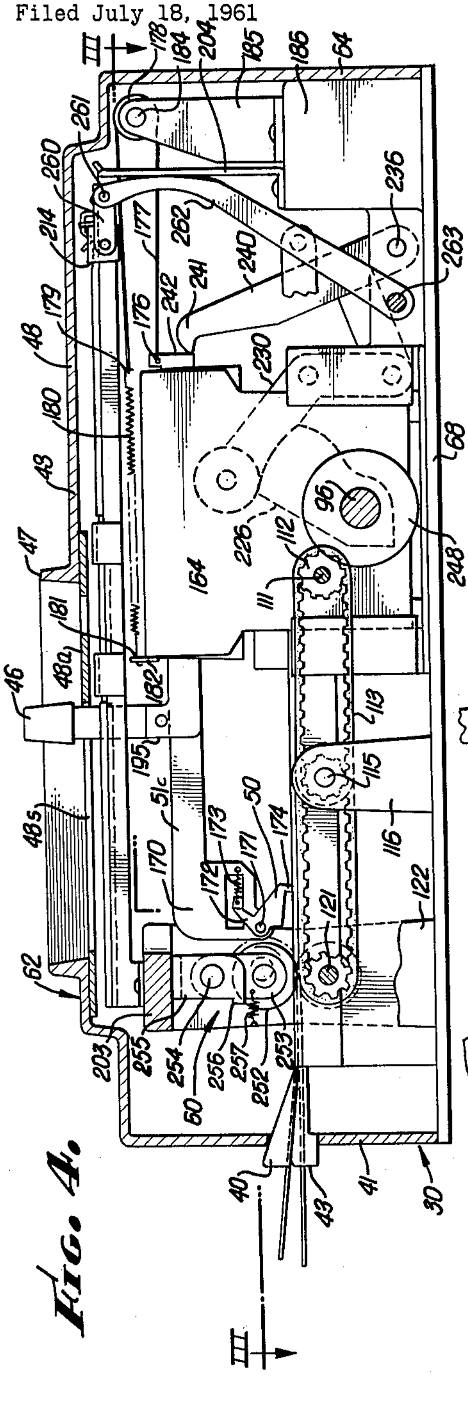
FIG. 4 is a sectional view taken in a vertical plane indicated by line IV—IV of FIG. 3.
Figure 5:
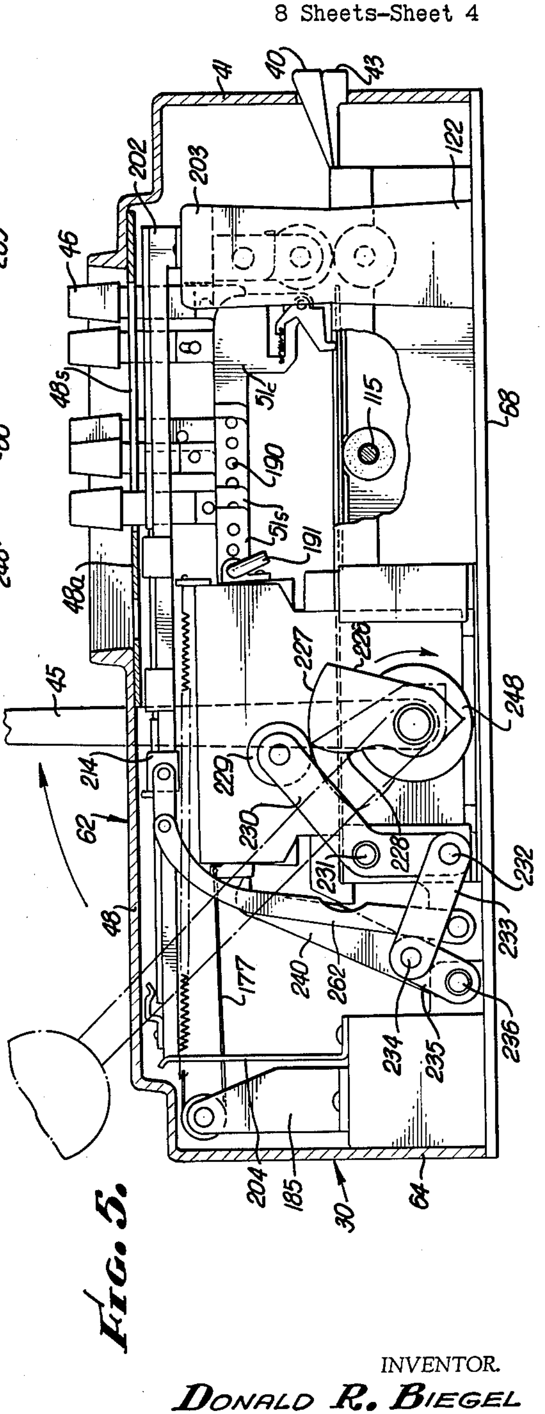
FIG. 5 is a vertical sectional view taken in the plane indicated by line V—V of FIG. 3.

As indicated in FIG. 3 the form 35 may be positioned transversely of the machine 30 for introduction into an entry opening 40 provided in the front wall 41 of the external housing 42 of the machine. Immediately below opening 40 is provided an opening 43 for the card 31 which is introduced lengthwise. The form 35 and the card 31 are inserted sufficiently into the machine so as to initially contact a form and card transport means as described later. Before an actuating arm 45 can be drawn forwardly to actuate the punching operation of the machine and to transport the form and card into the machine for a sensing and punching operation, variable data keys 46 projecting upwardly from a rectangularly defined area 47 on the top wall 48 of the housing must be moved. When the amount of sale has been selected, the actuating arm 45 may be drawn forwardly to first advance the card 31 and form 35 to their selected positions within the machine. Means are provided to guide both the card and the form along paths in parallel planes and means are provided for orienting both the card and the form so that they are in precise accurate position for the succeeding operations of the machine. The machine 30 is so designed and arranged that the first 45° of movement of actuating arm 45 will accomplish this part of the operation.

During the next 45° movement of the actuating arm 45, punch selector means are actuated so as to draw a plurality of hole sensing fingers 50 across the top face of the credit card 31. When a finger 50 engages a hole in the card it stops further movement of a biased selector bar 51 to which it is attached and positions a punch button 52 over a punch member 53 which corresponds in location to the coded arrangement of the data holes in the credit card 31. Means 55 are provided for locking in a preselected position certain of the selector bars 51 as to transfer fixed station data to the record form. The key buttons 46 are also connected to selector bars 51*v* for moving such selector bars with associated punch buttons into a selected position with respect to a punch member 53. The punch means also includes a movable punch frame 57 which is directly connected with the actuating arm 45 through a single cam shaft 96 so that as the actuating arm 45 is driven through a third 45° angle and into forward horizontal position the punch frame 57 is lowered and the punch members 53 are driven downwardly into punching engagement with the record form.

Upon the return or backstroke of the actuating arm 45 the several general operations described above are substantially reversed, the punch members being moved upwardly out of engagement with the record form, the biased punch selector bars are returned to their initial position, and the credit card and record form are transported forwardly for ejection from the machine. During ejection of the credit card and record form from the machine a printing operation occurs at printing means 60 so that the name of the owner of the card will be imprinted on the record form. Various interlock means are provided in order to prevent undesirable operation of the machine before certain machine positions have been set in order to prevent damage to the machine and to prevent misuse of the machine. The machine 30 will now be described in detail.

*Housing and Frame Means*

Figure 1:
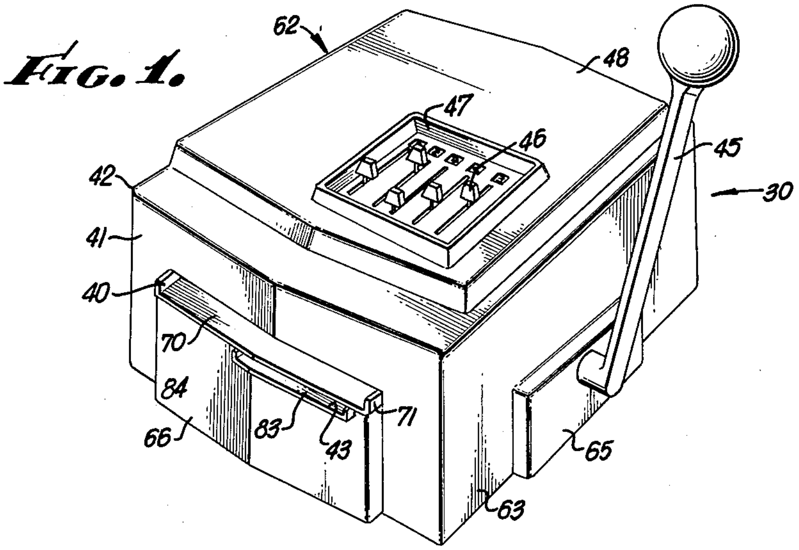
FIG. 1 is a front perspective view of a data recording machine embodying this invention.

In FIG. 1 a housing 62 for the machine of this invention is shown, the ornamental and design characteristics of said housing being the subject of a co-pending design application Serial No. D. 64,090, now Design Patent 192,056, issued January 9, 1962. The housing 62 comprises in addition to front wall 41 and top wall 48 the side walls 63 and back wall 64, one of said side walls 63 having a side housing extension 65 adjacent actuating arm 45. The front wall of said housing includes a forward housing extension 66. It should be noted that the housing 62 thus provides a relatively low profile and that the over all area occupied by the housing is relatively small. The machine 30 is thus readily adapted to be positioned upon a small table or a counter without occupying much space. It will also be noted that the only openings through which the machine may become exposed to weather are the limited slot-like openings in the top wall within the delineated rectangular area 47 and the aprons forming the opening 40 and 43 for the invoice form and the credit card. It is understood that the housing 62 may be readily formed of any suitable plastic or light metal material and is waterproof and weatherproof.

The housing 62 may be seated upon a frame base plate 68 and may be secured thereto in any suitable manner (not shown).

*Card and Form In-Feed*

In FIGS. 3, 4, 9 and 10 may be best seen the card and form in-feed means for introducing the card 31 and sales slip form 35 into the machine. The form 35 is held transversely of the machine 31 and introduced edgewise into the opening 40 defined by a horizontal wall 70 provided with upturned side lips 71. The side lips 71 are outwardly flared and terminate with wall 70 at 72 just inwardly of the opening 40. The inner ends of lips 71 merge smoothly with internal surfaces of parallel angle-shaped guide members 74 (FIG. 11) which extend in parallel longitudinal relation to the machine to the punching zone The members 74 may be carried by suitable upstanding walls 75 supported from the base plate 68. The top horizontal inwardly extending leg 76 of each member 74 overlies an end margin of the record form 35. The inner ends of members 74 terminate at an opening 77 (FIG. 10) provided between a punch plate 78 and a die plate 79. The punch plate 78 may be provided with a downwardly turned end portion 80 which defines a stop face 81 for accurately positioning the invoice form longitudinally of the punch zone.

The credit card in-feed, in this example, lies below the opening 40 and comprises the opening 43 defined by a wall 83 having upturned side lips 84 outwardly flared to facilitate initial entry of the card 31. The wall 73 and lips 84 terminate inwardly of the opening 43 as at 85 and smoothly merge with a card guide plate 86 supported in suitable manner from upstanding posts 87 on base plate 68 and provided with inturned longitudinal edge portions 88 defining parallel guide grooves 89. The guide plate 86 extends to a die block frame 90 having a wall 141 having a transverse top recess 91 supporting said inner end of plate 86.

The top recess 91 may be relieved centrally of the card as at 330 to accommodate a longitudinally movable biased card stop member 331 having a horizontal portion 332 slidable beneath guide plate 86. A spring 333 biases the stop member 330 toward the front of the machine and engages an upstanding stop lip 334 with the front edge of guide plate 86. When a credit card is advanced into card reading position it will be longitudinally positioned by stop lip 334; the biased stop member 331 permits slight movement of the card longitudinally during actuation of the machine as hereafter described.

Figure 22:
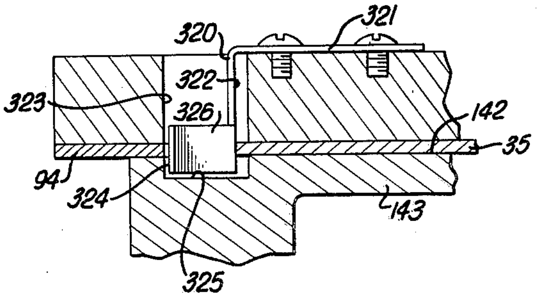
FIG. 22 is a fragmentary view showing a register spring for the invoice form.
Figure 23:
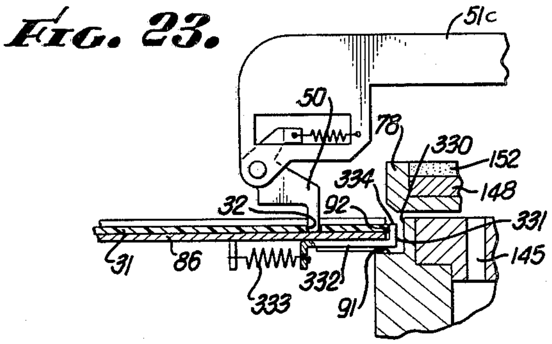
FIG. 23 is a fragmentary view of a biased final positioning means for the credit card.

The card 31 is thus accurately longitudinally positioned by stop face 92 and laterally positioned by the grooves 89. The record form 35 is accurately laterally positioned at the punch zone by shims 94 held between male plate 78 and the die block frame 90. In FIG. 22 a pair of spaced register springs 320 are shown for precisely laterally positioning the invoice form 35 in the punch zone and holding the same therein. Each spring 320 comprises a horizontal portion 321 secured to the top face of punch plate 78 (at the left of FIG. 9) and having a depending portion 322 extending through an enlarged port 323 for positioning diverging spring ears 324 in the place of form 35 and in the wall of a recess 325 provided in the top surface of top wall 143. It will be apparent that as an invoice form 35 is advanced to punch position the left front corner will contact inclined face 325 of spring ear 324 and the spring will urge the form 35 to the right. It will be understood that this action is in addition to the tendency of the drive wheels of the advancing means to also direct the credit card to the right. When the form reaches its final position the springs 320 are operative to positively bias the card against the right edge of the punch zone.

*Card and Form Advancing Means*

During the first 45° movement of the actuating arm 45 the inserted card and invoice form is advanced into selected positions against stop faces 92 and 81, respectively, and in longitudinal and lateral orientation. The actuating arm is connected at its lower end to a transversely extending shaft 96. The shaft may be supported by suitable bearings 97 in upstanding walls 98 of a gear frame 99 adjacent side wall extension 65. Spaced bearings 100 and 101 may be provided in upstanding walls 102 of the die block frame 90. In the gear box 99 a gear 104 on shaft 96 meshes with a gear 105 of relatively small diameter carried on a stub shaft 106, said gear being connected with an enlarged side gear 107 which meshes with a countershaft gear 108 which engages a pinion gear 110 provided on one end of a transversely extending shaft 111 which is slightly cocked or angularly disposed out of normal with respect to the direction of the path of movement of the form 35. The shaft 111 may be supported from bearings (not shown) provided in the die block frame 90. Inwardly of inner wall 98 shaft 111 may carry a sprocket 112 which supports one end of a gear or tooth-type pulley belt 113 carried at its other end by a sprocket 114 supported on a shaft 115 supported in suitable bearings provided in an upstanding post 116 and upstanding walls 75 which support angle members 74. Inwardly of sprocket gear 114 shaft 115 may carry a second sprocket 118 which meshes with a toothed belt 119 connected at its other end to a sprocket 120 carried at the end of a shaft 121 supported by suitable bearings in upstanding members 122 outwardly of walls 75, said shaft extending through said walls 75.

Figures 8, 9:
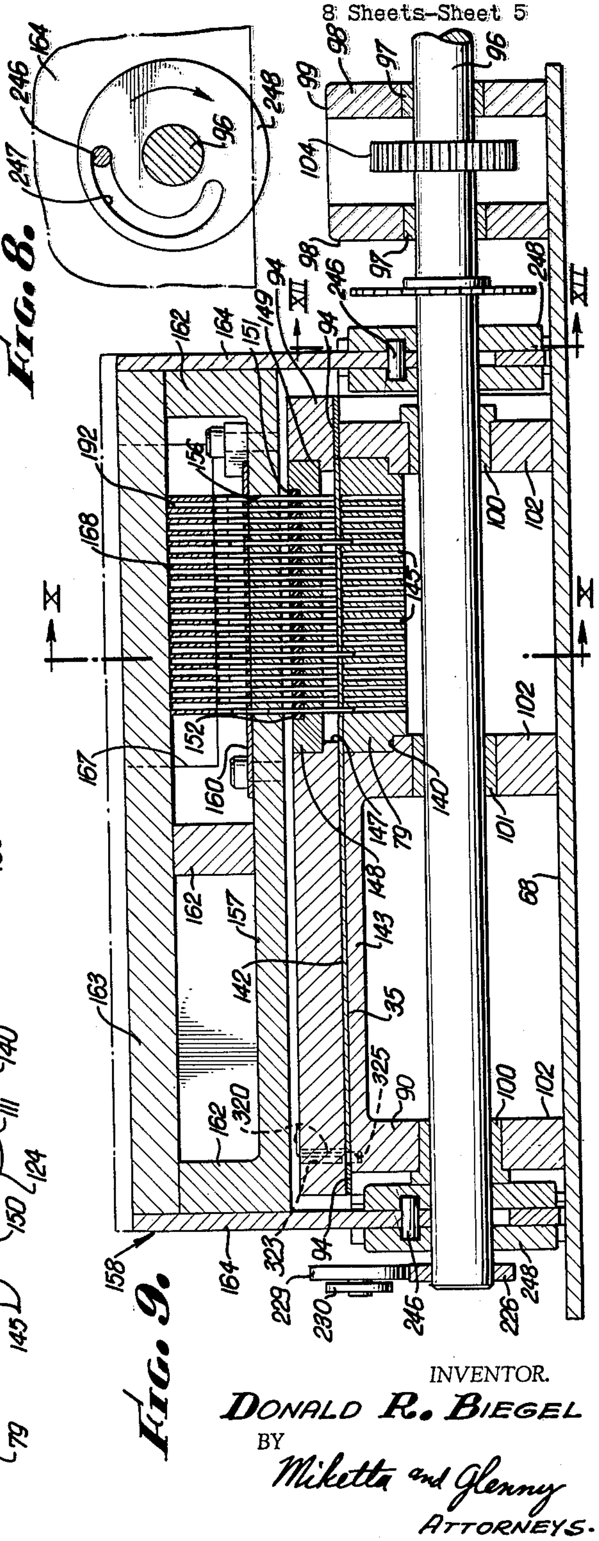
FIG. 8 is a fragmentary enlarged view of punch actuating cam means taken in a vertical plane similar to the plane indicated by line XII—XII of FIG. 9.
FIG. 9 is a transverse sectional view taken in the plane indicated by line IX—IX of FIG. 3.

Shaft 111 carries a pair of form engagement friction wheels 124 having their circumference about tangential to the plane of the bottom face of the form 35 when it is in the punch zone so as to positively drive the form against the stop 81 and to orient the same with respect to the edge surface of the shim 94 at the right of FIG. 9. Shaft 115 likewise carries form engagement wheels 125 the outer circumferences of which are permitted to engage the bottom faces of the record form through suitable openings 126 provided in the inturned flange 127 on upstanding walls 74. Shaft 121 is similarly provided with form engagement friction wheels 128 having their circumference extending through openings 129 provided in the flanges 127. Beneath the path of the credit card the bottom wall of the guide plate 86 is provided with a front opening 131 of suitable length for permitting engagement of friction wheel 132 carried by shaft 121 with the bottom surface of the credit card. The shaft 115 carries a smaller friction wheel 133 which extends through an opening 134 in the guide plate 86 for further spaced engagement with the credit card 30.

It will be apparent that the gear arrangement in the gear box or frame 99 is such that the pairs of wheels 124, 125, 128, 132, and 133 are driven at substantially the same rate of speed, all of said wheels having the same diameter, and that the movement of gear 104 through 45° is translated through the arrangement of gears into a gear ratio such that the wheels 124, 125, 128, 132, and 133 will be turned a sufficient number of revolutions and with sufficient overtravel in order to drive the form 35 and credit card 31 positively against their respective stop faces 81 and 92. It will be apparent that the form 35 and credit card 31 may be introduced into openings 40 and 43 sufficiently so that their inner edges lightly contact the rollers or wheels 128 and 132 so that the card and form will be driven virtually simultaneously in their path of travel toward and against the stop faces 81 and 92.

*Punch Means*

The punch means may comprise the male punch plate 78 and the female die plate 79 spaced therebelow (FIG. 9). In this example the die plate 79 may be of relatively thick metal section and supported upon peripheral shoulders 140 provided on longitudinally extending adjacent walls 102 and front and back walls 141 (FIG. 10) of the die block frame 90 which extends transversely across the base plate 68 for a substantial portion of the width of the plate 68. The top face of the die block 79 lies in the same plane as an adjacent face 142 provided on a top wall 143 extending between one side wall 102 and the intermediate wall 102. The die block 79 may be provided with a plurality of rectangular through openings 145 arranged in suitable grid fashion.

The male plate 78 is supported in spaced relation above the top face 142 and the top face of the die plate 79 by the shims 94 and thereby provides the front opening 77 as mentioned above. The male plate 78 may be secured in fixed relation to the die block frame by suitable means not shown. The male plate 78 is provided with an opening 147 opposite the die plate 79.

Within opening 147 is provided a punch plate 148 which may be seated and fitted on a peripheral shoulder 149 provided around opening 147. The punch plate 148 may be provided with a plurality of grid-like rectangular openings 150 aligned with the openings 145 in the die plate 79. The top face of the male plate 148 is provided with a top recess 151 in which may be received and secured in suitable manner longitudinally extending strips 152 of suitable friction material for frictionally holding and grasping side surfaces of punch members 53 extending through said openings 150 in the male plate. The friction strips 152 may be of neoprene or other suitable friction material so that the punch members 53 are not only held in a selected position thereby but may be moved when selected for a punch operation.

Each punch member 53 adjacent its top may have its opposite longitudinal edges provided with elongated notches 154 defining a head 155, said notches 154 being of sufficient length to permit relative movement of the punch member 53 with respect to the punch plate 148 to perform a punch operation. The top portions of punch members 53 project into aligned openings 156 provided in wall 157 of a yoke-like punch block frame 158 adapted to be reciprocally actuated by the actuating arm 45 as hereafter described.

The wall 157 carries a stripper plate 160 secured thereto in suitable manner and having a plurality of openings 161 for receiving the reduced section 154 of the top of the punch members 53. The stripper plate 160 cooperates with the punch members 53 in a manner similar to that described in my co-pending application Serial No. 80,146.

The movable punch frame 158 may comprise in addition to the wall 157 upstanding longitudinally extending outer side walls 162 and a top wall 163 secured thereto. The outer side walls 162 may have secured thereto downwardly extending end legs 164 provided with means for connection to the actuating shaft 96 as later described.

*Punch Selector Means*

The punch selector means (FIGS. 3, 4, 6, 7, 19) may comprise a plurality of selector bars 51 which extend and are movable longitudinally of the machine over the punch zone. The punch bars 51 may be grouped in accordance with the data being transferred from the credit card to the record form. For example, the bars 51*c* (FIG. 3) provide an intermediate grouping adapted to override the credit card 31. The group of bars 51*s* at one side of the above mentioned group may be pre-set and retained so as to repetitively record fixed or station data. On the opposite side of the main group 51 may be provided bars 51*v* which are adapted to be selected and moved in accordance with the amount of a sale transaction or other variable data by movement of the buttons 46.

Means for supporting and guiding said bars 51*c*, 51*s* and 51*v* may include front and back rectangular transversely extending openings 166 and 167 (FIG. 10) the bottom edge of said openings lying in the same plane and just above the top ends of punch members 53 when they are in normal non-set retracted position. The top edges of said openings 166 and 167 lie in virtually the same plane as the bottom face of the top wall 163 and bars 51*c*, 51*s*, and 51*v* may have abutment thereagainst as at 168 (FIG. 9). The bars 51*c*, 51*v* may be guided in their longitudinal movement by a pair of front and back guide members 190 and 191 having depending spaced fingers 192 defining slot-like openings for receiving said bars 51. Thus all of the bars 51*c*, 51*v* are precisely guided for longitudinal parallel movement in relation to the columns of punch members 53, to the data holes in the credit card 31, and to the format or arrangement of desired punched holes to be made in the record form 35.

Each punch bar 51*c* may be provided with an enlarged front head 170 (FIG. 4) providing a pivotal connection at its bottom forward portion as at 171 with a sensing finger 50. The sensing finger 50 includes an upwardly rearwardly directed portion 172 having connection to a biasing spring 173 connected to the head 170. The sensing finger 50 extends rearwardly from pivotal connection 171 and has a depending finger tip 174 adapted to be biased into contact with the top face of the credit card 31. Intermediate its ends each bar 51*c*, 51*s*, 51*v* is provided with a punch projection or button 52 (FIG. 7) adapted to be longitudinally positioned and located with respect to a selected punch member 53. At its back end each punch bar 51*c* may be connected as at 176 to one end of a cable 177 which may extend around a respective pulley 178 for connection at 179 with a biasing spring 180 having a connection at 181 to an upstanding crossmember 182 carried on the front face of the punch block frame 158. The pulleys 178 may be mounted on a common shaft 184 supported by upstanding brackets 185 secured to a platform 186 provided at the back of the machine adjacent back wall 64. Each of the bars 51*c* are thus biased normally rearwardly. The bars 51*c* and 51*v* are normally held in forward position by means hereafter described in connection with the actuating means.

The group of punch bars 51*s* may not be provided with a front head 170 because they do not sense a data hole in a credit card. The bars 51*s* are each provided with a punch button 52 in the same manner as punch bars 51*c*. Each bar 51*s* may be provided with a plurality of longitudinally selectively spaced ports 190 one for each of said punch members in the associated column. When the fixed or station data is determined in code the punch bars 51*s* may be selectively positioned above the corresponding punch members 53 and may then be locked or secured in such position by a lock pin 191*a* supported by a pin housing 192*a* carried on the front face of the punch frame 158 and extending therebeyond for engagement with aligned ports 190*a* of only the punch bars 51*s* as best seen in FIG. 3. It will thus be readily apparent that the fixed data portion of the machine may be readily preset either in the factory or in the field.

Figures 11, 12, 13:
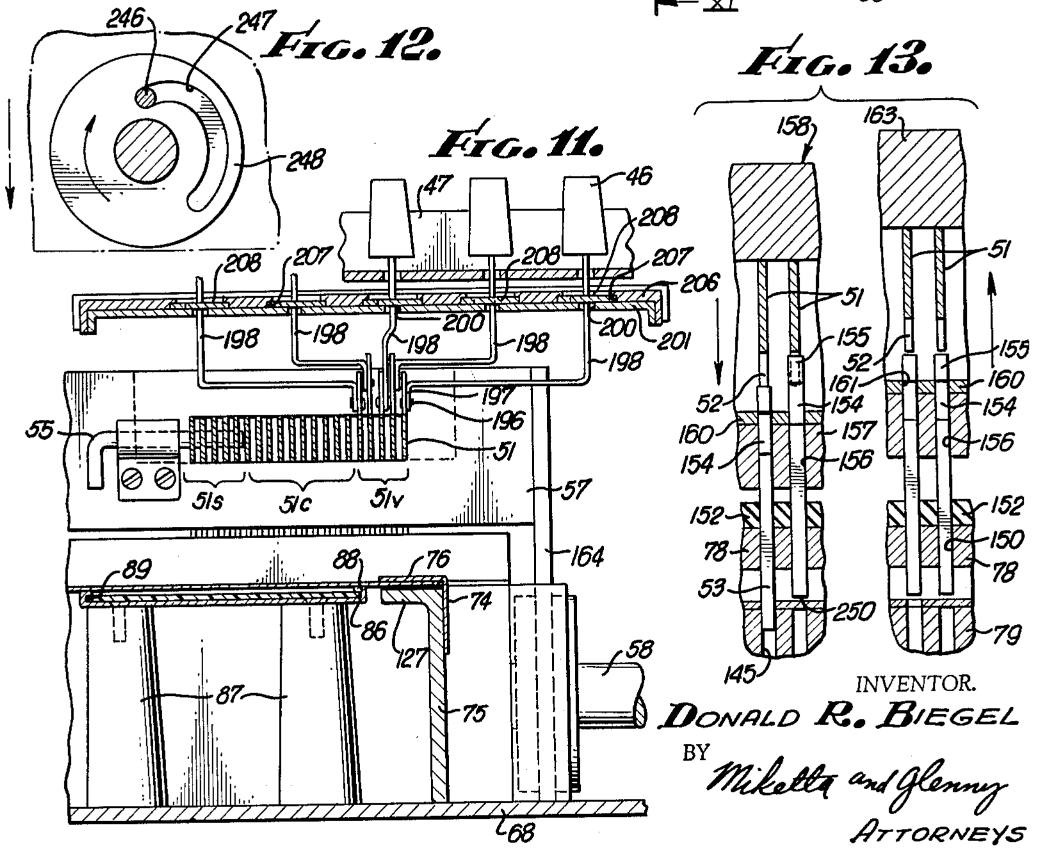
FIG. 11 is an enlarged fragmentary sectional view taken in a vertical transverse plane indicated by line XI—XI of FIG. 10.
FIG. 12 is a fragmentary enlarged sectional view taken in the plane indicated by line XII—XII of FIG. 9.
FIG. 13 is an enlarged fragmentary sectional view showing the punch means in punch position and in non-punch position.
Figure 16:
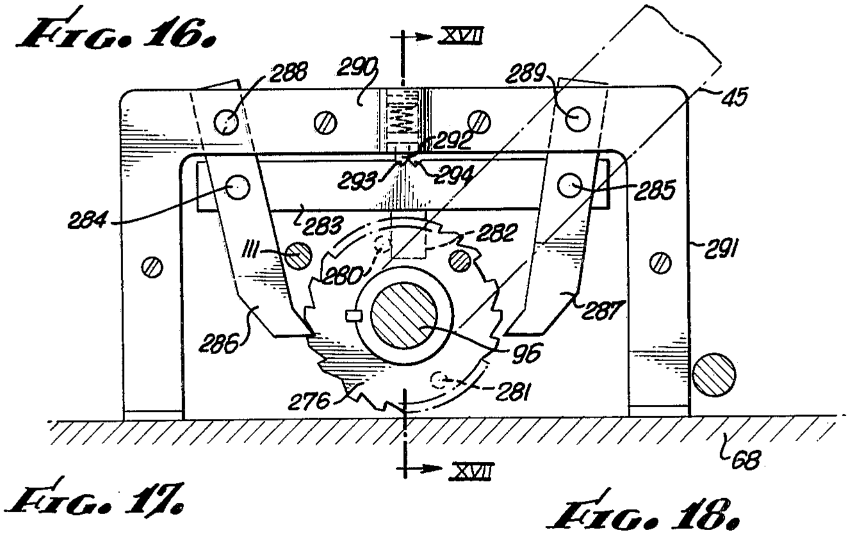
FIG. 16 is a fragmentary sectional view taken in the vertical plane indicated by line XVI—XVI of FIG. 3.

The variable data bars 51*v* are likewise not provided with front heads 170 because they do not engage a credit card or other data-bearing means. Each bar 51*v* is supported from the punch frame 158 in the same manner as the other bars and may include at its front end an upstanding portion 195 (FIGS. 10, 14) provided with a suitable vertical pin and slot adjustment connection at 196 with a depending end 197 of a suitably configured connecting stem 198 carrying at its top end the variable selector data button 46. As best seen in FIG. 11 the stems 198 may be bent at different places along their lengths in order that the rows of data buttons 46 may be suitably laterally spaced apart so as to permit ease of manipulation thereof by the fingers of the hand. It will be apparent that the depending portions 197 are connected to the upstanding ends of the bars 51*v* in quite closely spaced relation and that such variable bending of the stems 198 permits selected lateral positioning of the buttons 46 with respect to each other.

Each stem 198 projects upwardly through a longitudinally extending slot 200 provided in a bottom member 201 carried by a key board frame 202 (FIGS. 2, 3) secured at its front end to a transverse member 203 supported by the upstanding columns 122 and at its back end by upstanding brackets 204. The keyboard frame provides a top wall 206 provided with a plurality of enlarged in width guide slots 207 adapted to slidably receive a key ratchet bar 208 provided with a plurality of ratchet teeth 209 along one side edge thereof. The ratchet bars 208 have a fixed connection with stems 198 and are provided with indica in the form of numerals from 0 to 9 which may be viewed through square-shaped windows 211 in wall 48*a*. Each ratchet bar 208 extends in non-set position to the back end of wall 202*a* and is provided with an upstanding end stop 212. In its forwardmost position the stop 212 abuts the back edge of a movable transverse member 214 adapted to clear the variable data key bars.

Each ratchet bar 208 is provided engagement with a ratchet dog 215 pivotally mounted by a pin 216 and biased into engagement with teeth 209 by a spring 217 having one end bearing against the dog adjacent its engagement pawl and at its other end connected to a lug 218 carried by the key board frame 202. It will be noted that the guide grooves 207 may terminate at the location of ratchet dogs 215 and to retain the bars 208 in proper position a pair of longitudinally spaced transverse members 220 are secured to the frame 202 and override the bars 208.

It should be noted that the wall 48*a* of the housing within the recess 47 is provided with longitudinally extending slots 48*s* to permit forward and backward movement of the key bar stem 46 so as to selectively position an indicia beneath the window 211 provided in said wall 48*s*.

In normal un-set position each key button 46 is at its backwardmost position with respect to the slots 48*s* and no indicia will be observable through the window 211. Upon moving the key button 46 forwardly indicia are seen sequentially positioned beneath the window 211 and upon selection of a particular indicia, the selected position of bar 51*v* is maintained by the ratchet dog 215 and the ratchet teeth 209 until buttons 46 are reset or cleared automatically as at the end of a punching operation.

*Actuating Means*

As noted above, the first 45° movement of the actuating arm 45 in a forward actuating stroke rotates the shaft 96 sufficiently so that through the gear train hereinbefore described the cerdit card and the sales invoice will be moved into their oriented precise position for a punching operation. In the next 45° movement of the actuating arm 45, indexing will occur, that is, the punch selector bars 51*c* will be moved across the top face of the credit card in order to selectively position bars 51*c*.

For this purpose, the actuating shaft 96 may carry at its end opposite to actuating arm 45 a cam member 226 (FIGS. 4, 5, 6, 9) having a cam face 227 of arcuate section uniformly spaced from the shaft axis and a succeeding cam face 228 of the first convex and then concave configuration rapidly progressing toward the shaft axis. The cam faces 227 and 228 are followed by a cam wheel 229 rotatably mounted at one end of an angle lever 230 pivotally connected intermediate its ends at 231 to a frame member and pivotally connected at its other end to one end of a link 233 having a pivotal connection at 234 to the top end of a crank arm 235 fixedly connected to one end of a transversely extending shaft 236. Shaft 236 may be mounted in suitable bearings carried by brackets 237 (FIG. 3) and intermediate walls 238 on the base plate 68. Between walls 238 the shaft 236 carries a selector bar holder arm 240 having a front transverse edge portion 241 extending the width of the group of selector bars 51*c* and in contact with the back edges thereof at at 242.

Figure 6:
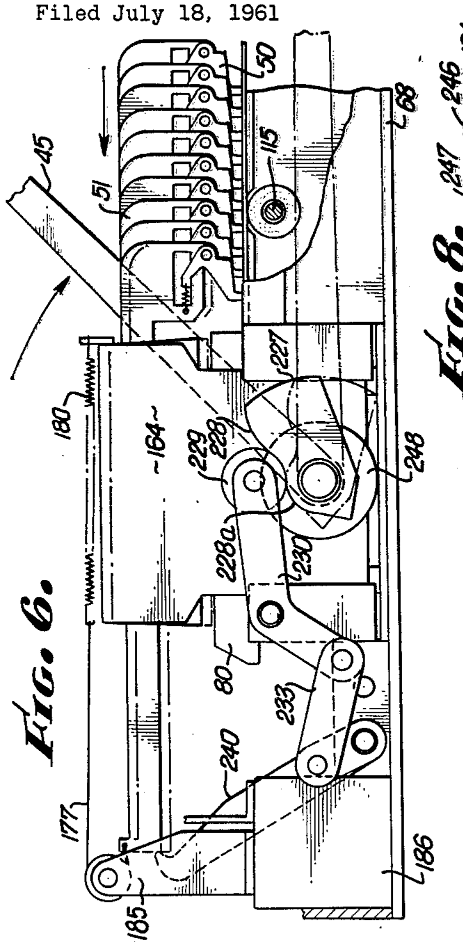
FIG. 6 is a fragmentary sectional view taken in the same plane as FIG. 5 with part of the machine omitted and showing indexing and punching positions of the actuating means.
Figure 7:
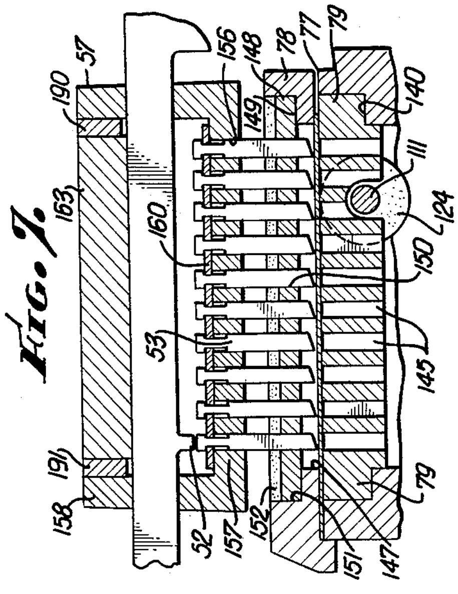
FIG. 7 is a fragmentary enlarged sectional view taken in a vertical longitudinal plane similar to the plane indicated by line X—X of FIG. 9.

While wheel 229 travels along face 227 (the first 45° of arm 95) virtually no motion or displacement is transmitted to holder arm 240. When the follower wheel 229 has traveled to the end of the arcuate cam face 227 it will commence to follow the convex and then the concave cam face 228. As it does so, the angle lever 230 is rotated about its pivotal connection at 231 causing the link 233 to turn the crank arm 235 and the shaft 236 in a direction while will produce retraction of the selector bar holder arm 240. As the bar 240 is retracted rearwardly each of the selector bars 51 are permitted to move rearwardly along their selected path because of the biasing springs 180 and the sensing fingertips 74 are moved across the top face of the credit card. If there is a data hole in the path of movement of the finger tip 174, the finger tip will be biased by spring 174 into said hole and the edges of the hole of the card will retain the selector bar in this selected position. Selector bars 51*c* not selected, that is, bars for which a data hole was not in their path, are retracted completely to the back end of the machine where they remain in contact with the bar holder arm 240 (FIG. 6). The cam wheel 229 now rests in the concave portion of the cam face 228. Thus punch buttons 52 on selected bars 51 are positioned in opposed relation to corresponding punch members 53.

It may be noted at this point that further movement of the actuating arm 45 will not produce a change in the position of the bar holder arm 240 because the arcuate cam face 228*a* is disposed at the same radial distance from the axis of the shaft 96.

Figure 10:
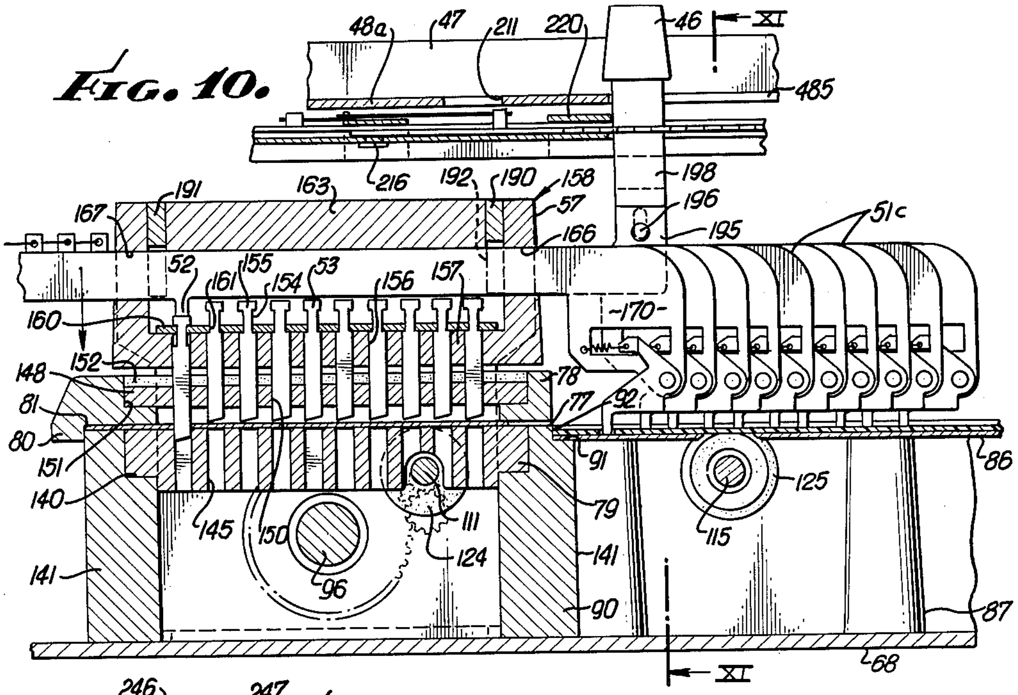
FIG. 10 is an enlarged fragmentary sectional view taken in the vertical plane indicated by line X—X of FIG. 9.

During the next 45° of movement of actuating arm 45, that is, to a final forward horizontal position, the shaft 96 is turned further and the punch block frame 158 is positively driven downwardly. Means providing connection between the frame 158 and the shaft 96 to correlate its turning with the downward movement thereof, is provided at the end of legs 164. The bottom ends of legs 164 may carry fixed pins 246 each of which extends from opposite side faces of leg 164 and opposite ends thereof are received within identical cam grooves 247 provided in circular discs 248 fixed to shaft 96. The configuration of the cam groove 247 is shown in FIGS. 8 and 12; FIG. 8 shows the position of the pin 246 at one end of the cam groove 247 and represents the initial starting position of actuating arm 45. As the actuating arm 45 turns through its first 90° of movement as described above, the relationship between the pin 246 and the cam groove 247 does not change because the arc of the groove is uniformly spaced from the axis of shaft 96. Thus during the time that the credit card and form are being moved into ultimate position and the selector bars 51*c* are being actuated, the punch frame 158 is retained in its uppermost position. However, during the last 45° of movement of the actuating arm the cam groove 247 turns sharply toward the axis of the shaft 96 as at 248 and the pin 246 is drawn and driven downwardly toward the axis of the shaft 96. Thus the punch frame 158 is positively driven downwardly and since the top edges of the selector bars are in contact with the bottom face of the top wall 163 as at 168, selected punch members are driven downwardly (FIGS. 10, 13) and button 52 abuts under pressure a punch member 53. Each punch button 52 in abutment with a selected punch member 53, drives said member 53 downwardly relative to the punch plate 148 and through the invoice form therebeneatth. The lower cutting face 250 of member 53 is received within an opening 145 in die plate 79. The unselected punch members 53 (FIG. 10)

are provided sufficient clearance below selector bars 51*c*, 51*v* so that they will not be urged downwardly by such movement. The friction material 152 as well as the invoice form 35 will prevent any punching thereof unless punch member 53 is positively contacted and driven by a button 52.

It should be noted that when punch bar frame 158 is driven downwardly and the selected bars 51*c* are moved downwardly the sensing fingers are also urged downwardly at the sensing end of the bars 51*c*. Such downward movement of the sensing fingers produced a longitudinal force component acting against the edges of perforations in the credit card in which a sensing finger tip is engaged and tends to place the credit card under compression between the stop member 311 and the sensing fingers. To relieve such compression and to prevent buckling of the credit card and also undue wear on the edges of the perforations in the credit card, the biased stop member 331 is adapted to move longitudinally forward for a slight distance of approximately 1/16 of an inch in order to relieve such compression. It will be readily seen that when the punch frame 158 is moved upwardly and the sensing fingers are returned to normal biased position the compressive forces on the credit card will be relieved and the stop lip 334 will slightly move the credit card toward the credit card opening.

Upon completion of the forward stroke of the actuating arm 45 and the punching operation, the actuating arm 45 may be returned by movement to the rear of the machine to its initial starting position. During such movement it will be apparent that the shaft 96 is reversed in rotation, the interengagement of pin 246 with cam groove 247 produces immediate lifting of the punch frame 158 during the first 45° of return movement of arm 45, and such lifting movement engages the stripper plate 160 with the heads 155 of the selected punch members 53 so that they are immediately lifted from engagement with the invoice form and are returned to normal non-punch position. Lifting of the punch frame 158 also lifts the selector bars 51*c*, 51*s*, and 51*v*. All of the punch members 53 are thus cleared from the plane of the invoice form.

In the second 45 degrees of movement of the actuating arm 45 in its back stroke, the cam member 227 causes the cam wheel 229 to impart motion to the selector bar holder 240 and to positively drive the bar 240 forwardly to advance the selector bars to their initial front position. At the same time turning of the shaft 96 drives in a reverse direction the card and form infeed means namely friction wheels 124, 125 and 129 for the invoice form and wheels 134 and 132 for the credit card. The invoice form is driven immediately forwardly but the credit card is retained in its position until the selector bars 51*c* are positively driven forwardly because of the interengagement of the fingers 174 with perforations in the card. As the selector bars 51*c* are moved forwardly the selector bar holder arm 240, the friction wheels 133 and 132 assist such forward movement of the credit card. The sequences of movement of the invoice form and credit card are so correlated with actuating arm 45 that the card and invoice form will be in proper superimposed relation for the printing operation thereon as they are ejected from the machine and as later described. It will be apparent that in such movement of the credit card toward its opening 84 the fingers 50 will readily snap out of the holes in the card because of the pivotal connection of fingers 50 and the direction of the biasing force of the cards. The tip faces of fingers 174 may be suitably tapered or beveled to facilitate such retraction of the fingers 50 during ejection of the credit card. The form and credit card are ejected from their respective openings at virtually the same time.

*Printing Means*

Printing means for imprinting or stamping the embossed characters on the credit card onto the sales invoice form may comprise an ink printing roller 252 (FIG. 4) rotatably mounted on a pair of depending leg members 253 pivotally connected at 254 to a depending U-shaped bracket 255 secured to the bottom surface of transverse member 203 above the path of the credit card. The legs 253 may be slightly biased forwardly against a stop 256 carried by bracket 255 by a spring 257 connected at one end to leg 253 and at its other end to a lug provided on member 203. It will thus be apparent that when the credit card is initially introduced into the machine the printing roller 252 will be biased rearwardly and will not produce an imprinting action on the card and invoice form. However, upon the credit card being moved in the opposite direction as during ejection of the card, the printing roller 252 will be biased and urged against the stop 256 and will be pressed for imprinting engagement against the credit card, the invoice form and the bottom drive roller 132.

While the exemplary machine shows printing means 60 with the credit card entering the machine above the sales invoice form and including embossed characters, it will be understood that when a debossed card is employed, the credit card may be introduced into the machine below the invoice form and a printing operation accomplished. Such change in position of the credit card with relation to the invoice form will not affect the remaining operation of the machine because of the lateral offsetting of the oriented positions of the credit card and the sales invoice form. It will be noted that the sales invoice form is in oriented position before the data hole selecting movement of the selector bars 51*c* commences.

*Interlock Means*

In order to properly sequence the several operations of the machine, to prevent damage to the machine, and to prevent misuse of the machine, preconditioning and interlock means are provided.

Figure 14:
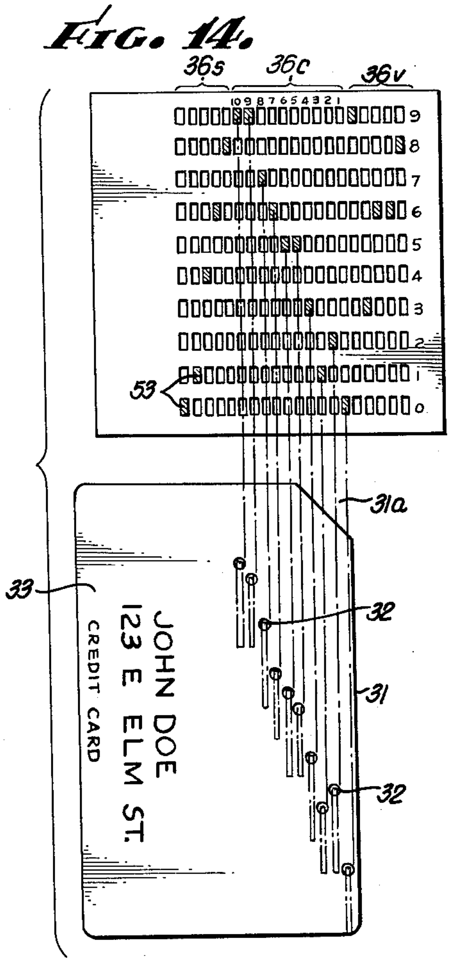
FIG. 14 is a schematic plan view showing the relation of a credit card with coded holes therein and the punch grid and punch bar arrangement.

One such preconditioning means required proper orientation of the credit card 31 when it is placed in opening 43 for acceptance by the machine. As best seen in FIG. 14, the forward or front right corner of card 31 is provided with a diagonal or cam edge 31*a*.

Adjacent shaft 21 and just before the card 31 reaches the card reading zone an upstanding pin 310 blocks the path of the card. Pin 310 may be carried on a horizontal arm 311 pivoted to the card guide plate 312, said plate having an arcuate slot 313 to slidably receive the pin. The arm 311 is biased by a spring 314 connected at one end to arm 311 adjacent pin 310 and at its other end to a fixed lug 315. When the credit card is properly introduced into opening 43 and advanced the diagonal edge 31*a* will contact pin 310 and urge, as by a wedging or camming action, pin 310 to the right and out of the path of the card. Pin 310 may be received in a notch in the wall defining the credit card path.

In the event the opposite plain or uncut end of credit card 31 is introduced into opening 43 and the card then advanced, pin 310 provides a positive stop or block to further advancement of the credit card since the straight transverse edge of the card will not be operative to urge the pin to one side of the card's path. Thus credit card 31 must be positioned only in one way and oriented before acceptance of the card by the machine. This is readily accomplished because diagonal edge 31*a* is of such a length as to be readily recognized by the eye.

It will be readily apparent that a diagonally cut corner may also be provided on the data record form 35 so that it will be accepted by the machine 30 in only one position. For this purpose a similar blocking pin construction (not shown) may be employed.

Figure 2:
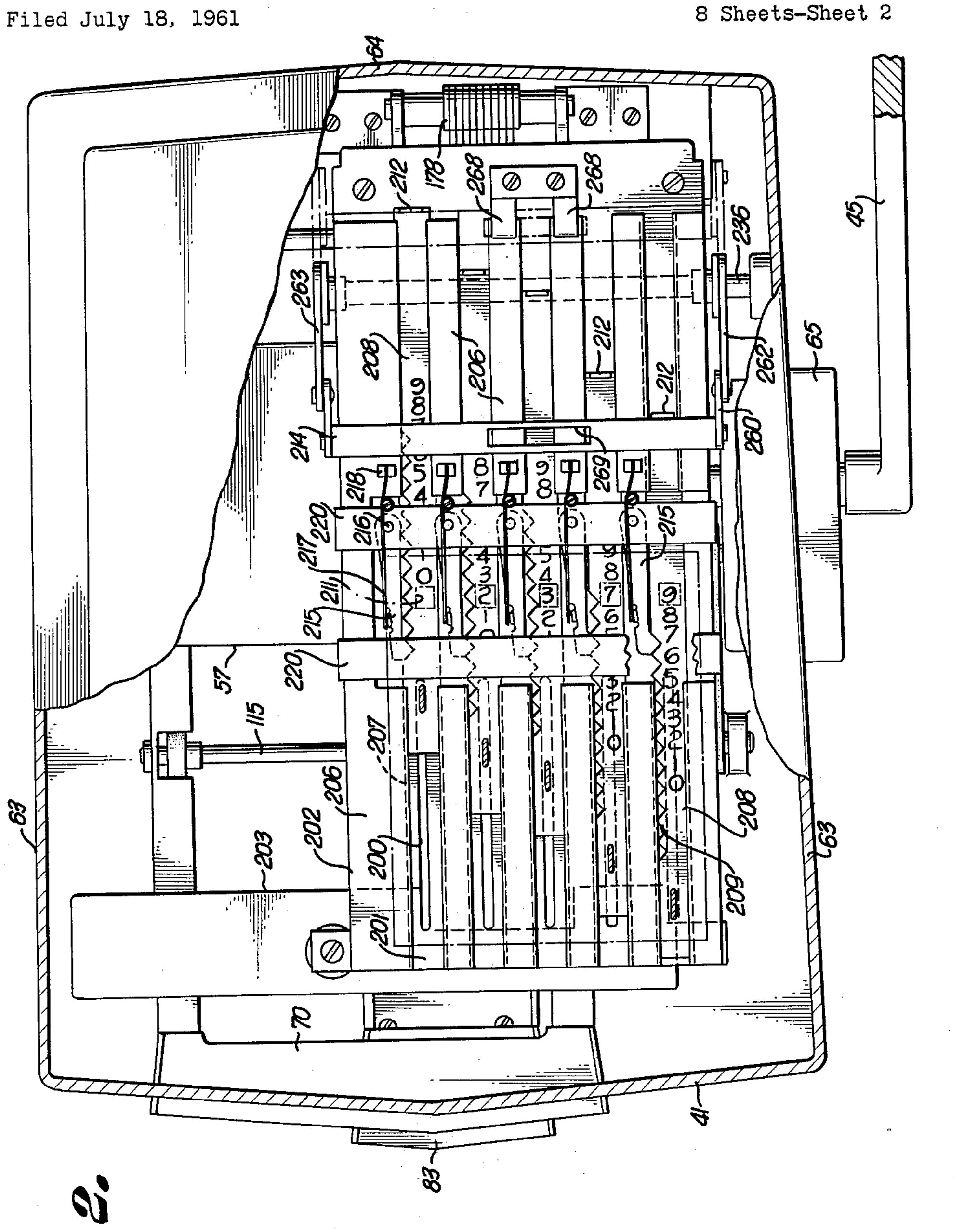
FIG. 2 is a top view of the machine shown in FIG. 1 with the top cover broken away.

In the exemplary machine, actuating arm 45 cannot be drawn forwardly until a variable data selector button 46 has been moved to a selected number. Such interlock means is associated with the key clearing bar 214. In normal operative position bar 214 is in a forward position as shown in FIG. 2 and determines a stop for forward movement of the key bars. When a punch operation has been completed and actuating arm 45 is moved to the rear, the clearing bar 214 is likewise moved to the rear so that all stops 212 are in transverse alignment adjacent the rear of the machine. The clearing bar 214 is slidable on the top surface of top wall 206 and at its each end may be pivotally connected to a forwardly directed link 260 pivotally connected at 261 to the top of an upstanding member 262 pivotally mounted at its bottom end on a transverse shaft 263 extending between walls 238 and therebeyond as best seen in FIG. 3. Member 262 is biased forwardly by a spring 264 connected at one end to a pin 265 carried by member 262 intermediate its ends and at its other end to a pin 266 carried by wall 98. The member 241 is held in clearing position against springs 264 by a pair of downwardly biased spring detents 268 (FIG. 2) secured to the transverse end wall of the key bar frame 202. Clearing bar 214 may be provided with spaced detent receiving recesses 269.

Member 262 carries at pivotal connection 265 a forwardly extending interlock member 270 having a vertically enlarged head 271 having a top face 272 held against upward movement by a horizontal lug 273 projecting from wall 98. In back position of clearing bar 214 the opposite edge face 274 of head 271 is opposed to a pin 275 projecting laterally from the side face of a ratchet wheel 276 carried on shaft 96 between wall 98 and the punch frame wall 164. Interlock bar 270 is normally biased downwardly by a spring 277 connected to bar 270 intermediate its ends and connected to the base plate 68. It will be apparent that any attempt to move the actuating arm 45 forwardly when clearing bar 214 is in back position will cause pin 275 to abut the bottom face 274 of the interlock head and since head 271 cannot move upwardly because of the overprojecting lug 273, further rotation of the shaft 96 will be prevented.

Manual selection and movement of the variable data selector button 46 will release the spring detents 268 from their engagement with the recesses 269 in the clearing bar 214 so that the bar 214 will be moved forwardly by springs 264. Such release and forward movement of the clearing bar 214 will drive the interlock bar 270 forwardly between the lug 273 and the pin 275. The lower edge of bar 270 will ride along the pin 275. In such condition the actuating arm may now be moved forwardly for the beginning of a punching operation.

Figures 17, 18, 19, 20:
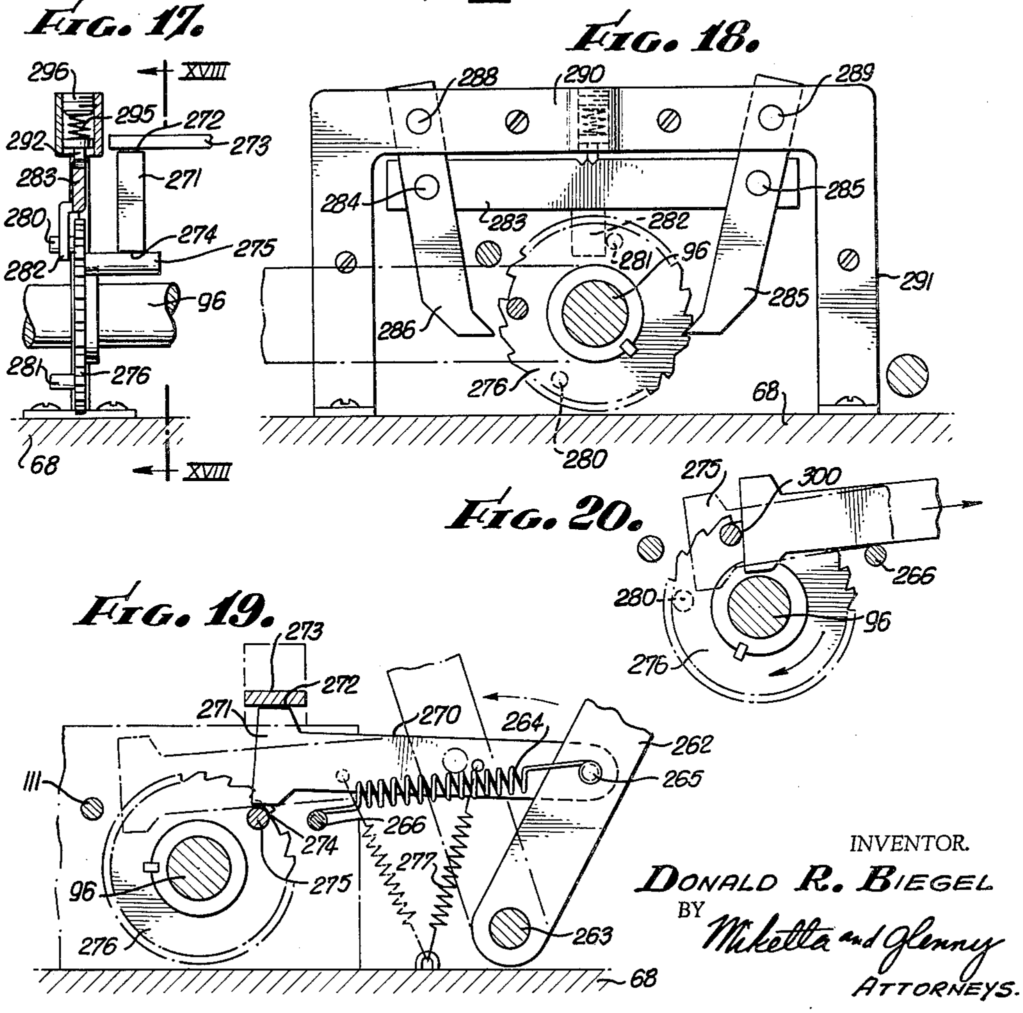
FIG. 17 is a fragmentary sectional view taken in the plane indicated by line XVII—XVII of FIG. 16.
FIG. 18 is a fragmentary sectional view taken in the plane indicated by line XVIII—XVIII of FIG. 17 and similar to the plane of FIG. 16.
FIG. 19 is a fragmentary enlarged view taken in a plane adjacent to that of FIG. 16 and showing interlock means.
FIG. 20 is a fragmentary view of FIG. 19 showing the interlock in operative position when the machine is in punch position.
Figure 21:
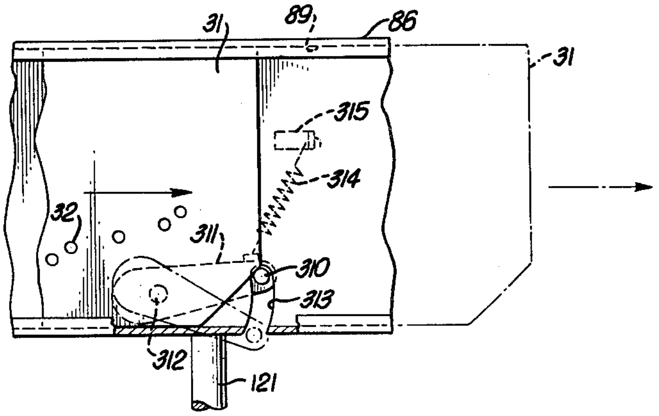
FIG. 21 is a fragmentary top plan view of a credit card stop pin adapted to cooperate with a card for accepting or rejecting the card.

Once the actuating movement of arm 45 has begun, means are provided for preventing any return or backing up of the actuating arm before a punching operation is completed. In this exemplary machine, such means includes the ratchet wheel 276 provided with diametrically opposite laterally projecting pins 280 and 281 on the side of the wheel opposite from pin 275 (FIG. 17). Pins 280 and 281 are disposed to alternately contact a depending element 282 on a horizontally disposed bar 283 pivotally connected at 284 and 285 to interconnect in unitary swingable fashion a pair of hanging ratchet dogs 286 and 287 pivotally mounted at 288 and 289 to the top member 290 of an inverted U-shaped support means 291 secured to the base plate 68. The top member 290 may carry a downwardly biased detent element 282 adapted to alternately engage closely spaced detent notches 293 and 294 for holding the ratchet dogs 286 and 287 in one of two selected positions. The detent element 292 is biased by a spring 295 seated against a set screw 296 at one end.

In starting position, pin 280 is in contact with element 282 and horizontal member 283 is held with the detent 292 in engagement with the left notch 293 and ratchet dog 286 is engaged with the teeth in the ratchet wheel 276. Ratchet dog 287 is disengaged and it will be apparent that as the actuating arm 45 is moved pin 280 moves away from element 282, ratchet dog 286 slips from one ratchet tooth to the other ratchet tooth and arm 45 may be drawn forwardly to complete a punching operation. If arm 45 is stopped and an attempt is made to back up arm 45, ratchet dog 286 will engage the teeth on the ratchet wheel 276 and will positively prevent any such partial backstroke.

When arm 45 has reached its ultimate position, pin 281 has been moved into contact with depending element 282 and has moved the bar 283 horizontally so that the detent element 292 is now in engagement with detent notch 294. Such contact of pin 281 laterally shifts ratchet dogs 286 and 287 so that dog 286 is held out of engagement with teeth on the ratchet wheel 276 and the dog 287 rides on the ratchet wheel as shown in FIG. 18. Thus the actuating arm 45 is permitted to move in its backstroke to initial starting position.

As arm 45 moves in its backstroke, it will be apparent from FIG. 20 that pin 275 on ratchet wheel 276 contacts as at 300 the head 271 of the interlock bar 270 and positively drives the interlock bar rearwardly and thus drives the clearing bar 214 rearwardly which by its engagement with stops 212 positively clears the variable data key selection means.

The general operation of the machine and the operation and structure of each of the several subassemblies have been described above. It will be understood that the entire punching operation is accomplished by a relatively small arc of movement of a single actuating arm which transmits such movement to a single actuating shaft. The shaft is so connected with the punch block frame that the moment of force of the movement of the actuating handle is amplified so that the punching operation may be performed with relative ease. It should also be noted that the operation sequentially of the several subassemblies and parts of the machine is performed in a positive manner and that precise fool-proof operation is achieved. The machine is made up of relatively few parts and provides a simple maintenance-free mode of operation capable of use under conditions found outside as in a gasoline station, machine shop and the like, and also capable of use in industrial applications under adverse conditions.

Various modifications and changes may be made in the machine as described above, some of such modifications being mentioned in connection with the printing of embossed and debossed cards. It will be readily understood that the grouping of the selector bars 51*c*, 51*s* and 51*v* may be rearranged and more or less bars may be included in each group, depending upon the type of operation for which the machine is to be used. Other types of lock means may be used for selector bars 51*s* and other types of external variable data selector buttons may be used for selection of bars 51*v*. The biased finger at the front end of selector bar 51*c* may be changed in shape and biased somewhat different in manner, if desired. It is important to note that the sensing of the data holes in the credit card are performed at a sensing zone which is located in horizontal spaced relation to the punch zone and thus facilitates the simplification of the punch means wherein a selector bar is provided with a single punch button for selective engagement with one of ten punch members.

It will be readily apparent to those skilled in the art that the employment of standard IBM tab cards requires precise punching in precise spaced relation of tab openings in said cards. Generally speaking, the precise location of the tab openings in the IBM card must be within tolerance of .002 in. Such precise punching requires not only precise positioning of data form 35 but also imposes severe space limitations on the arrangement of perforations 32 in the credit card 31. In order that columns of tab openings may be precisely punched, the perforations 32 related to immediately adjacent columns are offset with relation to the center line of the column. Thus the selection of the same number or digit in immediately adjacent columns is accomplished by longitudinally offsetting sensing fingers while permitting precise positioning of the punch buttons 52 in adjacent side-by-side non-offset relation.

In FIG. 14 perforations for columns 2 and 3 are shown with the perforation for column 2 in advance of the perforation for column 3. The column 2 perforation will result in the punching of a digit 2 whereas the column 3 perforation will result in the punching of a digit 1. Digits 9, in both columns 9 and 10, are indicated as being punched. It should be noted that the perforation for digit 9 in column 9 lies adjacent and below the perforation for digit 9 in column 10. It will thus be apparent that the dimensional distance on the bar 51c for column 10 between the sensing finger and the punch button 52 must be slightly less than the distance between the sensing finger and the punch button 52 of the bar 51c related to column 9. Such rigid space restrictions imposed by the standard tab card are met by the offsetting relationship of perforations 31.

Various other modifications and changes may be made which come within the spirit of this invention and all such changes and modifications coming within the scope of the appended claims are embraced thereby.

I claim:

1. In a data-recording machine for a data card provided with perforated coded data holes and a record storage form to which said coded data is to be transferred, the combination of: means for introducing a data card and data form into said machine in the same direction and initially positioning the same in closely adjacent parallel planes; means for advancing said card and form in separate paths in the same direction along their respective planes; means for orienting said data card at a card reading zone; means for orienting said form at a punch zone beyond said reading zone; punch means including a fixed punch plate carrying a plurality of rows of punch members at said punch zone and a fixed die means spaced therefrom and supporting said form between said punch members and said die means; means for selecting a punch member for a punching operation comprising an elongated punch bar movable over one row of said punch members and including a punch button, and a data hole sensing finger carried by said bar in spaced relation to said button, said sensing finger having a pivotal connection to said bar and a spring biasing said finger about said pivotal connection toward said card; and means for actuating said card and form advancing means, said punch member selecting means, and said punch means whereby said card and form are moved respectively into said reading zone and into punching position and said form is punched in accordance with said coded data on said card.

2. A machine as stated in claim 1 wherein said punch member selecting means includes a group of punch bars locked in selected position with respect to associated punch in selected position with respect to associated punch members for repetitively recording preselected fixed data.

3. A machine as stated in claim 1 wherein said punch member selecting means includes a group of punch bars selectively movable with respect to associated punch members for recording variable data.

4. A machine as stated in claim 1 including printing means operable in the path of movement of the card and form and spaced from the card reading and punch zones.

5. A machine as stated in claim 1 wherein said actuating means includes a punch bar carrying frame, an actuating shaft below said die means, and cam means connecting said shaft and said frame.

6. In a data machine including a data-bearing card having data means thereon and a data storage form, the combination of: means for initially introducing a data bearing card and a data form in adjacent superimposed parallel relation into said machine; means for advancing said card and form in such relation in a common direction in parallel planes and for then transporting said form beyond said card for ultimate positioning thereof in a punching zone in off-set relation to said card; a punch means including a plurality of punch members normally held in spaced relation to the plane of said form and a fixed die plate supporting said form; means for selecting a punch member for a punch operation in accordance with data on said card and including a longitudinally movable punch bar having a punch button for contact with a selected punch member and having pivotally mounted means spaced from said punch button for sensing and holding engagement with a data means on said card; and means for moving said punch bar with its button into contact with the selected punch member for punching the record form.

7. In a machine as stated in claim 6 including a plurality of punch bars manually movable for selecting variable data.

8. In a machine as stated in claim 6 wherein said sensing means on said movable punch bar includes a biased finger member adapted to engage with a data hole in said card and to hold said punch bar against further movement.

9. In a machine as stated in claim 6 wherein said moving means includes means for simultaneously moving said punch bars across said card for sensing data means thereon.

10. A machine as stated in claim 6 including printing means for imprinting said data form with data means on said card as said data form is ejected from said machine.

11. A data machine for credit cards and data forms and the like comprising in combination: means for advancing and orienting a card in a card reading zone; means for advancing and orienting a data form in a punch zone; said zones being laterally disposed; a plurality of punch members held against lateral movement at said punch zone; means laterally extending between said card reading zone and said punch zone including a punch element positionable over a punch member at said punch zone and a finger element for sensing said card at said reading zone; and means for moving said laterally extending means relative to said zones to locate a punch element in accordance with data being sensed and for then moving said punch element into punching contact with said punch member.

12. A machine as stated in claim 11 including manually operable means for selectively positioning certain of said punch elements at said punch zone.

13. A machine as stated in claim 12 including interlock means cooperable with said manually operable means whereby said moving means is restrained against movement until said manually operable means is actuated.

14. A punch selector means for use with a data machine having spaced card reading and punch zones comprising: a biased slidably movable elongated bar member having a longitudinal edge with a punch button protruding therefrom intermediate its ends and having a biased data sensing element adjacent one of its ends and extending in the same direction as said punch button.

15. A punch selector means for use with a data machine having laterally offset spaced card reading and punch zones comprising: a slidably movable bar member extending laterally between and over both zones and having an integral punch button protruding therefrom at the punch zone and intermediate its ends and having a pivotally mounted data sensing element adjacent one of its ends and at the card reading zone.

16. In a data recording machine for transferring coded information from a perforated credit card or the like to an invoice or data storage form or the like, comprising: a frame means; means on the frame means for accepting and initially positioning a credit card and data form in proximate parallel planes; transport means for said card and form supported from the frame means for advancing the card and form in the same direction in said parallel planes in superposed relation for at least a portion of the travel of said card and form; means for stopping said card in a card reading zone; means for stopping said form in a punching zone laterally spaced from the reading zone; spaced fixed punch and die plates on the frame means at the punching zone; a plurality of movable punch members in columns and rows carried by the punch plate and frictionally held in selected position; a punch selector means above said punch plate and punch members, said selector means including a plurality of movable bars each carrying a depending punch contact element selectively positionable along an associated row of punch members; a movable punch block frame slidably receiving upper portions of said punch members for limited relative movement with respect thereto and carrying said selector bars; an actuating means for such punch block frame for moving said punch block frame downwardly for pressure contact of the punch contact elements of selected bars with punch members for a punching operation.

17. A data recording machine as stated in claim 16 wherein said punch block frame includes a bottom wall apertured to receive upper portions of said punch members and a top wall spaced from said bottom wall, said selector bars extending through said punch block frame in said space and above said punch members.

18. In a machine as stated in claim 17 wherein said finger carried by each bar is biased and pivoted about an axis spaced from a card engagement tip of said finger.

19. A machine as stated in claim 16 wherein said punch contact elements on said selector bars in adjacent rows are longitudinally offset with respect to sensing fingers carried by adjacent selector bars, whereby adjacent punch members in a column may be actuated in close spaced relation.

20. A machine as stated in claim 16 wherein said punch selector means includes variable data selector bars separately operable from other selector bars; an interlock means including a lug on said frame member and means operable by the actuating means for rendering the actuating means inoperative until movement of a variable data selector bar to a selected position.

21. A machine as stated in claim 16 including means carried by said frame and means carried by said actuating means requiring completion of a punching operation upon actuation of said actuating means.

22. In combination with a data punching machine having a plurality of movable punch members in parallel rows and columns and adapted to be contacted to perform a punch operation, the provision of: a card with data perforations therein offset with respect to a center line of a column corresponding to a column of punch members for punching adjacent members in a column; a plurality of thin selector bars in adjacent side-by-side relation, each bar having a pivoted sensing finger and a punch contact element spaced therefrom, the punch contact elements of said adjacent bars being longitudinally offset with respect to sensing fingers of said bars whereby adjacent punch members in a column may be actuated with minimum of space therebetween.

23. In a data processing machine for use with a data-bearing card and a record storage form and including punch means having a fixed punch holding plate and a fixed die plate, and a plurality of punch members normally spaced from said die plate and defining a punching zone and means for actuating such punch members for a punching operation, the provision of: means for introducing a card and form in superposed proximate relation into said machine; means for advancing the card and form simultaneously in the same direction into said machine in such superposed relation for at least a portion of said advancement and for orienting said card in the card reading zone and said form in said punch zone, said card reading zone and said punch zone being in spaced relation in the direction of advancement of the card and form, said punch zone lying between said plates; and means including a pivoted sensing finger for sensing data on said card by movement of said finger thereacross, and a punch contact element carried by said sensing means and movable into operative relation with a punch member corresponding to said sensed data.

24. In a data processing machine comprising: a fixed punch block including a die plate and a punch member holding means; a plurality of punch members held in said punch member holding means in normally retracted position; means for introducing a data form between said die plate and said punch member holding means and for orienting said data form beneath said punch members; a movable punch frame means supported above said punch member holding means; a plurality of punch member selector bars carried by said movable punch frame means and selectively positionable across said punch members in spaced relation thereto; each selector bar having a punch projection extending downwardly for engagement with a selected punch member; means for holding said selector bars in selected position; and means including cam means for moving said punch frame means with said selector bars downwardly to engage the punch projections into pressure contact with selected punch members for driving the selected punch members through said data form.

25. A machine as stated in claim 24, including a card reading zone laterally spaced from said data form, at least certain of said selector bars having sensing fingers at their ends to sense data on a card positioned at a card reading zone, said sensing fingers being pivoted at one end of said selector bars.

26. A machine as stated in claim 24 including means carried by said movable punch frame means for moving each punch member into non-punch set position.

References Cited in the file of this patent

UNITED STATES PATENTS

| | | |
|---|---|---|
| 2,768,691 | Cooper et al. | Oct. 30, 1956 |
| 2,791,275 | Hooe | May 7, 1957 |
| 2,964,239 | Whitson | Dec. 13, 1960 |
| 2,994,473 | Farmer et al. | Aug. 1, 1961 |
| 3,008,632 | Grady | Nov. 14, 1961 |
| 3,017,076 | Braun | Jan. 16, 1962 |